United States Patent
Gibson et al.

(10) Patent No.: US 8,263,683 B2
(45) Date of Patent: Sep. 11, 2012

(54) INK FOR PRINTING ON LOW ENERGY SUBSTRATES

(75) Inventors: Danuta Gibson, Reach (GB); John M. Higgins, Cambridge (GB); Stephanie V. Desrousseaux, Cambridge (GB); Andrew M. Howe, Cambridge (GB); Andrew Clarke, Haslingfield (GB); Christian V. Nicholas, Watford (GB); John H. Hone, Chalfont St. Peter (GB)

(73) Assignee: Eastman Kodak Company, Rochester, NY (US)

( * ) Notice: Subject to any disclaimer, the term of this patent is extended or adjusted under 35 U.S.C. 154(b) by 239 days.

(21) Appl. No.: 12/517,213

(22) PCT Filed: Dec. 19, 2007

(86) PCT No.: PCT/GB2007/004891
§ 371 (c)(1),
(2), (4) Date: Jun. 2, 2009

(87) PCT Pub. No.: WO2008/075049
PCT Pub. Date: Jun. 26, 2008

(65) Prior Publication Data
US 2010/0068387 A1 Mar. 18, 2010

(30) Foreign Application Priority Data
Dec. 21, 2006 (GB) .................... 0625530.1

(51) Int. Cl.
*C09D 11/10* (2006.01)
(52) U.S. Cl. ........ 523/160; 523/161; 523/200; 523/205; 523/210; 524/555; 427/466
(58) Field of Classification Search .................. 523/160, 523/161, 200, 205, 210; 347/100; 106/31.13, 106/31.6, 31.27, 31.28
See application file for complete search history.

(56) References Cited

U.S. PATENT DOCUMENTS
5,462,591 A 10/1995 Karandikar et al.
(Continued)

FOREIGN PATENT DOCUMENTS
JP 05-148442 6/1993
(Continued)

OTHER PUBLICATIONS
Machine Translation of JP 2006-206664 A (Aug. 10, 2006).*
Machine Translation of JP 2006-206665 A (Aug. 10, 2006).*

*Primary Examiner* — David W Wu
*Assistant Examiner* — Vu A Nguyen
(74) *Attorney, Agent, or Firm* — Andrew J. Anderson

(57) ABSTRACT

The invention provides an aqueous inkjet ink composition comprises a polymeric compound comprising discrete particles responsive to an external stimulus, and a functional material, wherein the functional material may be incorporated as part of the polymeric particles, the particles causing the composition to have a first rheological state and a different second rheological state in response to a stimulated change in conditions, the first rheological state being associated with a first lower viscosity of the composition, wherein the particles have a first lower volume, enabling the composition to pass through an inkjet printhead orifice and the second rheological state being associated with a second higher viscosity of the composition, wherein the particles have a second higher volume, enabling immobilisation of droplets of the composition on a substrate. The inkjet composition is particularly useful in a continuous inkjet printing system for printing onto a wide range of surfaces including impermeable surfaces.

17 Claims, 9 Drawing Sheets

U.S. PATENT DOCUMENTS

| | | |
|---|---|---|
| 6,866,707 B2 | 3/2005 | Kato |
| 6,869,470 B2 | 3/2005 | Kato |
| 7,608,646 B1 * | 10/2009 | Ganapathiappan et al. .. 523/160 |
| 2003/0073758 A1 | 4/2003 | Botros |
| 2005/0222296 A1 * | 10/2005 | Nakazawa et al. ............ 523/200 |
| 2006/0128830 A1 | 6/2006 | Breton et al. |

FOREIGN PATENT DOCUMENTS

| | | |
|---|---|---|
| JP | 06-248208 | 9/1994 |
| JP | 11-236523 | 8/1999 |
| WO | 99/07796 | 2/1999 |
| WO | 01/36547 | 5/2001 |

* cited by examiner

Ink D

Ink C

Ink C

INK FOR PRINTING ON LOW ENERGY SUBSTRATES

FIELD OF THE INVENTION

The present invention relates to an aqueous ink composition suitable for printing on various substrates, especially impermeable substrates, and particularly for continuous inkjet printing systems.

BACKGROUND OF THE INVENTION

Inkjet printing is a non-impact method for producing images by the deposition of ink droplets in a pixel-by-pixel manner to an image-recording element in response to digital signals. It is used widely for commercial and business applications for printing on various substrates from paper to cable marking or wide format vinyl sheeting and across markets ranging from industrial labelling to short-run printing to desktop document and pictorial imaging.

There are various methods which may be utilized to control the deposition of ink droplets on the image-recording element to yield the desired image. In one process, known as continuous inkjet, ink is supplied under pressure through orifices that produce jets of ink, which break up into a continuous stream of droplets which may be of different sizes. The droplets are subsequently sorted such that some droplets form the image whereas others are caught and recirculated. For example, droplets can be selectively charged as a means of sorting or their size can be selectively varied to allow them to be sorted by selective deflection using a stream of air. The droplets that have been caught can then be recycled from the catcher and redispersed within the bulk ink.

In another process, known as drop-on-demand inkjet, individual ink droplets are projected as needed onto the image-recording element to form the desired image. Common methods of controlling the projection of ink droplets in drop-on-demand printing include piezoelectric transducers and thermal bubble formation.

The inks used in the various inkjet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in either case. Commonly used carrier media include water, organic solvents such as alcohols, ketones or hydrocarbons, as well as mixtures of water and organic co-solvents, such as alcohols, esters and ketones.

An important characteristic of inkjet printing is the need to control the ink on the surface of the substrate onto which it is deposited. In the case of common inkjet recording elements, an important factor in achieving this is the absorption of significant portions of the ink, particularly the carrier medium, into some part of the substrate structure. As a consequence, the printed image can appear to be dry immediately after printing and the absorbed liquid can evaporate later. This allows organic solvents and co-solvents with low boiling points to be usefully incorporated into ink formulations, particularly for drop-on-demand inkjet printing.

However, liquid absorption does not occur when printing onto impermeable substrates and in this case either a very fast drying process is applied, much more volatile organic solvents are used as a major component of the carrier medium, or the ink droplets undergo some kind of phase-change on the substrate. All of these practices have significant disadvantages. For example, many impermeable substrates are heat-sensitive, many volatile organic compounds raise concerns about health and safety and phase-change inks produce significantly thicker printed layers because most of the ink droplet is solidified.

One of the advantages of inkjet printing is that it is a non-contact method and can be used to print onto a wide range of surface topography. However, the nature of the surface, particularly its surface energy, can still present difficulties. The surface energy quantifies the disruption of chemical bonds that occurs when a surface is created. It is the interaction between the forces of cohesion and the forces of adhesion which determines whether or not wetting occurs. If complete wetting does not occur, then a bead of liquid will form with a contact angle which is a function of the surface energies of the system.

Successful printing is normally achieved by applying inks with a surface tension lower then the surface energy of the surface. Unfortunately water has a very high surface tension, which makes it particularly difficult to apply satisfactorily as droplets onto low energy, impermeable surfaces.

Health and environmental concerns dictate a need for an ink with a significantly reduced, for example, not more then 10%, volatile organic solvent content. Patent Application Publication No. US 2003/0073758 describes an ink suitable for printing on flexible substrates wherein a small part of the volatile solvent has been replaced by water, but the major part of the ink still consists of a volatile organic solvent, such as ethanol or methylethylketone. Unfortunately, many aqueous inks are either not capable of sufficiently wetting the substrate or do not dry quickly enough at the speeds used in inkjet printing, especially in continuous inkjet printing wherein the time between successive drops is very significantly shorter than for drop-on demand inkjet systems.

Radiation-curable water-based inks have also been described for use in an inkjet process (patent application WO 99/07796), but often the resulting printed layers can be thick and may lack desirable physical properties, for example, sufficient flexibility. Such inks are usually high in viscosity, which makes the jetting process difficult, and it is often necessary to minimise viscosity by heating the ink significantly prior to printing. In addition, the curing process, which can involve complex equipment and considerable energy consumption, can in some cases be quenched by oxygen and require special measures, such as 'blanketing' under nitrogen. Moreover the printed image may be insufficiently hardened, or curing may continue after the initial curing time under the radiation source. Frequently the substrate needs to be treated to enable adequate adhesion of the cured ink to the substrate.

Other inks that work on a similar basis, often referred to collectively as 'phase change' inks, such as hot-melt inks, suffer from similar disadvantages. Hot-melt inks incorporate waxes which are solid at room temperature and melt when heated to decrease viscosity. Ink which is heated and melted in a printhead is ejected and deposited onto a substrate, usually paper, where it solidifies on cooling to form the printed images. This method avoids the use of volatile solvents but is, however, non-aqueous and one problem is the build-up of wax on the image where multiple droplets are placed to form a composite colour.

Another alternative is to use air-drying cross-linking polymers in a water-based ink (patent application WO 01/36547). However, the air-drying polymer can also harden around the orifices of a printhead, or on the recirculation catcher of a continuous inkjet printer, causing the same problems of poor image quality and productivity as mentioned hereinbefore for solvent-based inks. These polymers are extremely difficult to remove once they have cross-linked on the recirculation catcher, since eventually the hardened deposits block the catcher preventing further recirculation of non-printed drops, making them unsuitable for continuous inkjet printing.

U.S. Pat. No. 5,462,591 describes an aqueous phase change ink composition for use with a drop-on-demand inkjet printer and a porous substrate to reduce 'feathering' thereon, which comprises a water-soluble polyoxyalkylene or cellulose derivative that exhibits thermo-inversion properties, such that the water solubility decreases as the solution temperature increases. At a critical concentration, hyperthermogelation occurs on undergoing a phase transition to form stable gels on contact with a substrate. Typically on jetting an ink drop onto paper the drop will lose water by penetration therein and by evaporation, increasing the concentration thereby resulting in a rapid increase in viscosity. Alternatively the drop can be jetted onto a substrate that is above the thermo-inversion point, whereby contact with the warm substrate will instantly gel the drop.

JP06248208 discloses an ink composition comprising a monohydric alcohol and at least one water-soluble polymeric compound, wherein there is interaction between the polymer and the cellulose in the paper substrate. The composition disclosed therein is also for use with drop-on-demand inkjet printers to prevent feathering of ink drops when jetted onto the porous paper substrates, the aqueous ink in this case being inhibited from penetrating into the paper by molecular interactions.

However neither of the compositions disclosed in U.S. Pat. No. 5,462,591 and JP06248208 would be suitable for use under the high shear conditions employed during continuous inkjet printing, since polymer stringing could occur and drop 'break-off' would become unreliable.

US 2006/0128830 discloses that another means of viscosifying the ink when it has reached the substrate surface is to have a two-component ink wherein the components are mixed together in the ink but react on heating the substrate. However, the inks are dependent on significant heating (above 70° C.) of the substrate to achieve the required viscosity for droplet immobilisation, which restricts the type of substrates which can be printed by this method.

JP1999 236523 relates to inkjet printing on plain paper in which drying is assisted by the inclusion of volatile organic compounds or heating the substrate to around 80° C. It is emphasised therein that the substrate temperature has to be higher than the printhead temperature as swelling on the, generally porous, substrate has to be avoided. There is no mention therein of thermally responsive particles: the resins used may have thermally-switchable properties but the thermosensitive polymers are polyvinyl methylethers.

JP-05 148442 discloses pH-switchable particles in association with various colorants which swell on increase of pH. The ink has a pH above 6 to print on plain paper which relies on protons from the paper surface to gel the ink with the aim of reducing blotting of the ink droplets. Volatile water-soluble wetting agents are incorporated in the ink to lower surface tension and speed drying.

Pigment can be incorporated into an ink by encapsulating it in a polymer. U.S. Pat. Nos. 6,866,707 and 6,869,470 describe inks prepared from pigments coated with polymer resin which could then form a self-dispersed pigment via micro encapsulation. However, although stimulus-responsive materials, such as N-isopropylacrylamide, could be used to encapsulate pigment, the patents do not teach the use of these materials to enable a lower viscosity of ink in the printhead versus that of the substrate so that it could be used to print on a wide variety of substrates. Indeed the invention described in U.S. Pat. No. 6,866,707 is specifically for printing on plain paper.

PROBLEM TO BE SOLVED BY THE INVENTION

There is a need for an ink which is primarily water-based and hence safer and less environmentally hazardous, especially for printing on to packaging for food products, and in particular for printing onto 'low energy', impermeable surfaces such as polypropylene or polyethylene. The ink would desirably require a relatively low-solids content to allow relatively thin layers to be produced. It would also have a viscosity low enough to be jetted conveniently as droplets which could be immobilised rapidly on a wide range of surfaces, despite the low solids content and without the necessity for the application of, for example, high levels of heat or UV or IR radiation. Conveniently it could be re-dispersed readily if the ink were to dry undesirably in the printing device.

SUMMARY OF THE INVENTION

The present invention provides an aqueous inkjet ink composition which comprises a polymeric compound comprising discrete particles responsive to an external stimulus, and a functional material, wherein the functional material may be incorporated as part of the polymeric particles, the particles causing the composition to have a first rheological state and a different second rheological state in response to a stimulated change in conditions, the first rheological state being associated with a first lower viscosity of the composition, wherein the particles have a first lower volume, enabling the composition to pass through an inkjet printhead orifice and the second rheological state being associated with a second higher viscosity of the composition, wherein the particles have a second higher volume, enabling immobilisation of droplets of the composition on a substrate therefor.

Another embodiment of the invention relates to an inkjet printing method comprising the steps of:

A) providing an inkjet printer that is responsive to digital data signals;

B) loading the printer with an ink-receiving element comprising a support;

C) loading the printer with an aqueous inkjet ink composition as described above; and D) printing on the ink-receiving element using the aqueous inkjet ink composition in response to the digital data signals.

The invention further provides the use of an aqueous inkjet ink composition, as hereinbefore defined, especially in a continuous inkjet printing system, for printing onto a substrate, in particular an impermeable substrate, wherein the ink composition has a first lower viscosity and lower volume associated with a first rheological state such that the composition can pass through the orifice of an inkjet printhead and, in response to an external stimulus, a second rheological state associated with a higher viscosity and higher volume such that the composition when jetted onto a surface is immobilised thereon.

ADVANTAGEOUS EFFECT OF THE INVENTION

The ink composition comprising stimulus-responsive polymer particles is primarily water-based, thereby addressing environmental concerns, is redispersible and can adhere to a wide range of surfaces and in particular to impermeable surfaces normally used for packaging, such as polyethylene and polypropylene. The composition has a viscosity in the printhead such that it is conveniently jettable though a continuous inkjet printhead and will not harden irreversibly around the orifices or on the catcher where the ink is recirculated in the printer. Moreover the stimulus-responsive polymers can be selected such that the ink can have a significantly different viscosity on the substrate at the ambient temperature, thereby reducing the tendency of the printed drops to flow so that successive drops do not damage image quality

DETAILED DESCRIPTION OF THE INVENTION

Figure 1:
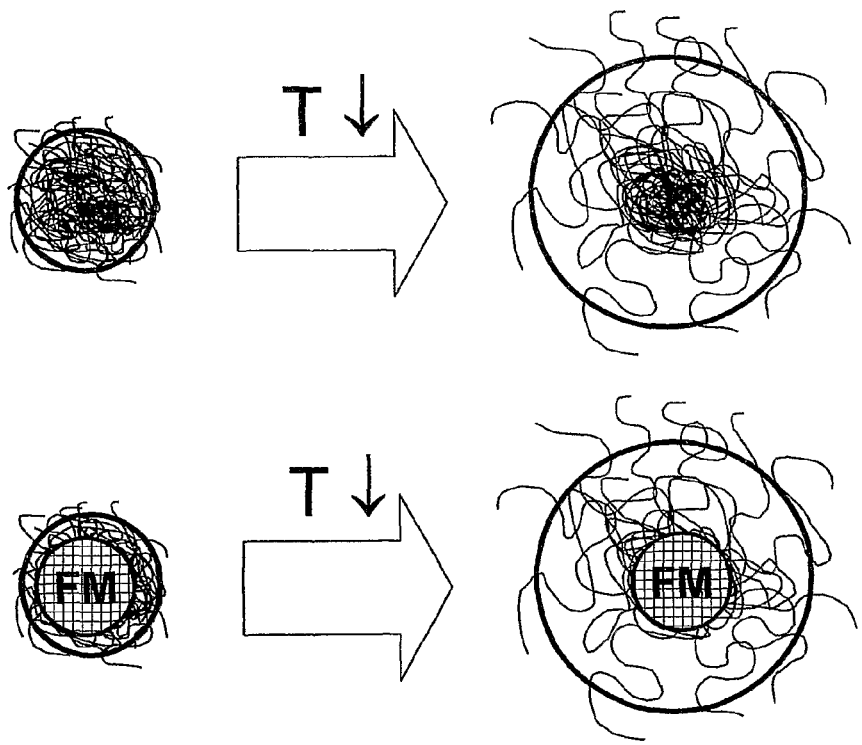
FIG. 1 shows the change in state with temperature of a stimulus-responsive particle (top) and with a functional material incorporated therein (bottom), from a collapsed state at the temperature of a warm printhead to a swollen state on a cooler substrate.

The aqueous inkjet composition of the invention is particularly suitable for use in a continuous inkjet printing system, although use in a drop-on-demand printing system is also included within the scope thereof.

According to the invention, polymer particles are added to a functional material in order to alter the viscosity of the ink in response to an external stimulus, such that on jetting an ink drop onto a substrate the drop is immobilized thereon.

The external stimulus may be, for example, temperature change (R. H. Pelton, P. Chibante, Colloids Surf., 1986, 20, 247), pH (R. J. Ketz, R. K. Prud'homme & W. W. Graessly, Rheologica Acta, 1988, 27, 531), light (M. Irie, M. Ishikawa, H. Masuhara, Makromol. Chem., Rapid Commun., 1991, 12, 687), redox potential (I. Tomatsu, A. Hashidzume, A. Hartada: Macromol. Rapid Communications, 2006, vol. 27, 238), electrical (B. D. Chin, O. O. Park, J. Colloid Interface Sci., 2001, vol. 240, 344) or magnetic (T. Mitsumata, K. Sakai, J-I. Takimoto, J. Phys. Chem. B, 2006, vol. 110(41), 20217), or a combination thereof (e.g. J. D. Debord, L. A. Lyon, Langmuir, 2003, vol. 19, 7662; S. J. Kim, M. S. Kim, S. I. Kim, G. M. Spinks, B. C. Kim, G. G. Wallace, Chem. Mater., 2006, vol. 18, 5805; W. Weng, J. B. Beck, A. M. Jamieson, S. J. Rowan, J. Am. Chem. Soc., 2006, vol. 128, 11663).

A 'functional material' is a material that provides a particular desired mechanical, electrical, magnetic or optical property. As used herein the term 'functional material' refers to a colorant, such as a pigment dispersion or dye solution, magnetic particles, conducting or semi-conducting particles, quantum dots, metal oxide, wax or non-'switching' polymer (as core polymer). Preferably the functional material, however, is a pigment dispersion or a dye solution.

As used herein with respect to viscosity and volume, the terms 'first lower' and 'second higher', refer to the viscosity and volume differentials of the composition in the printhead and on the substrate respectively.

In a preferred embodiment of the invention the external stimulus is temperature change and the temperature of the inkjet printhead is higher and the temperature of the printed substrate is lower, whereby the viscosity of the ink is altered from a lower viscosity fluid in the inkjet printhead to a higher viscosity fluid or a viscoelastic solid on the substrate.

The change in rheological states of the stimulus-responsive particles equates to differences in size or shape or more particularly volume, represented by equivalent spherical diameter of the particles in the inkjet printhead from that on the substrate, the term equivalent spherical diameter being used in its art recognized sense in recognition of particles that are not necessarily spherical. Thus the stimulus-responsive particles are in a collapsed state in the inkjet printhead, having an equivalent spherical diameter considerably less than the diameter of the inkjet nozzle to prevent blockage and enable jetting, typically less then 0.5 μm, preferably 0.3 μm or less, more preferably 0.15 μm or less and especially 0.1 μm to 0.05 μm.

Figure 2:
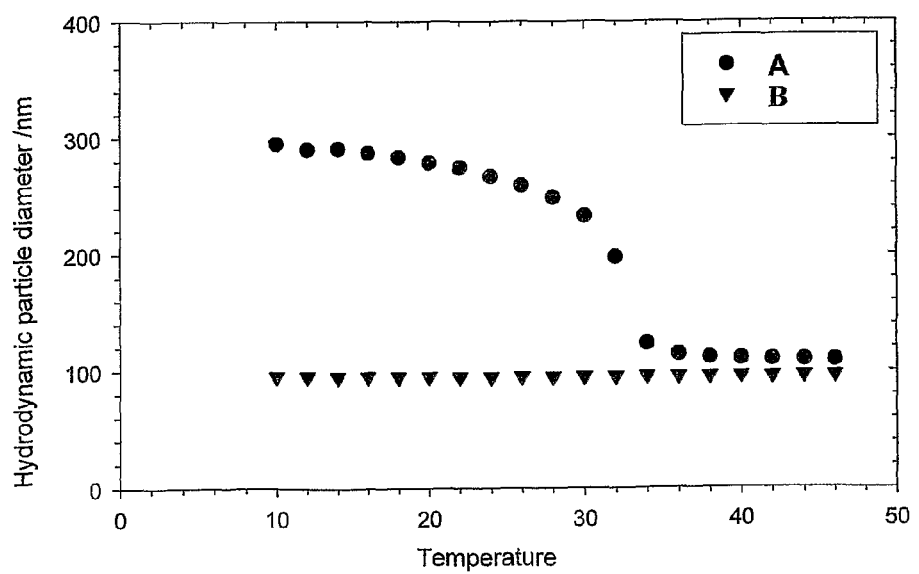
FIG. 2 is a graph of hydrodynamic particle diameter v. temperature of a stimulus-responsive particle (Curve A) and a latex polymer (Curve B).
Figure 3:
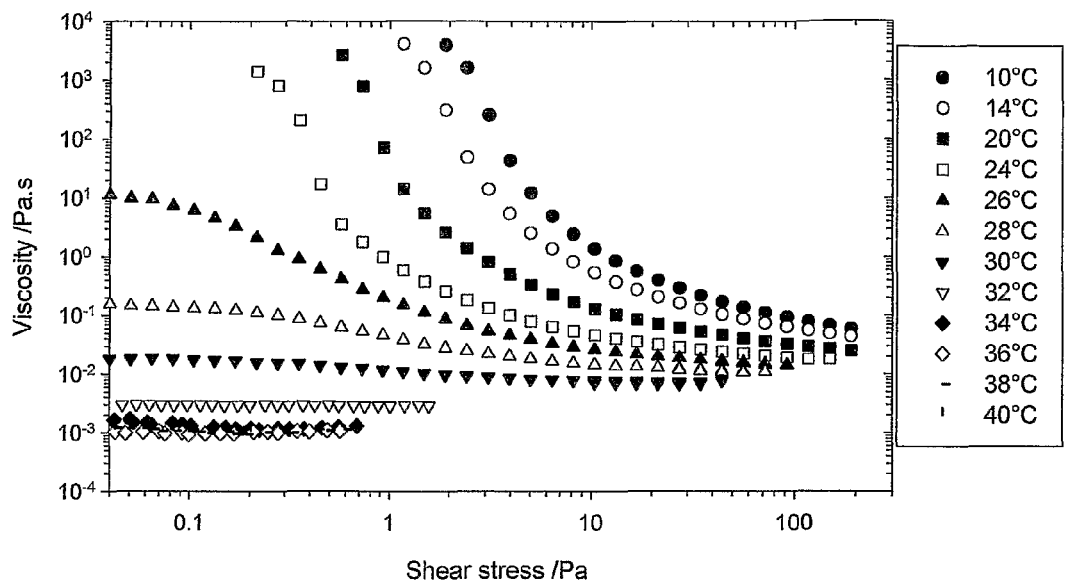
FIG. 3 is a graph of viscosity v. shear stress at a range of temperatures from 10° C. to 40° C. of the stimulus-responsive particles in water at a concentration of 4% w/w.

The temperature of the substrate will be lower, causing an expansion of the stimulus-responsive particles on hitting the substrate, as shown in curve A in FIG. 2, and a rapid increase in viscosity (FIG. 3). This can be contrasted with the use of a non stimulus-responsive latex polymer (Curve B in FIG. 2) wherein no expansion and hence no such increase in viscosity occurred. The increase in viscosity reduces the tendency for the printed droplets to flow or coalesce with other printed droplets on the substrate surface, reducing the number of printed defects.

In the embodiments wherein the stimulus-responsive particles are thermally-responsive, the temperatures for both the circulating ink and the substrate are such that they are on either side of the temperature at which the change in viscosity occurs, hereinafter the 'switching temperature'. In the preferred embodiment the temperature of the substrate would normally be at ambient temperature, generally in the range of about 18° C. to 25° C. and under normal humidity conditions. Therefore the temperature of the printhead would need to be higher and in practice the printer would circulate ink at about 30-50° C. to avoid any operating problems that might be caused by variations in ambient temperature. However, too high a temperature might cause problems by degrading the particle dispersion or through excessive evaporation.

In another such embodiment the temperature of the printhead could be higher than in the preferred embodiment described above, namely near a switching temperature of, for example, 50-70° C., if the particle dispersion were sufficiently stable and compensation were made for evaporation, in which case the substrate would then preferably be 25-50° C. to promote more rapid drying.

The 'switching temperature' can be fine-tuned to adapt to exterior conditions by appropriate selection of the stimulus-responsive polymer particles and/or by the inclusion/exclusion or adjustment of concentration of other components in the composition. However it is desirable that the viscosity change from a lower to higher viscosity and a concomitant volume change from a lower to a higher volume induced by the temperature change occurs over as small a temperature range as possible.

This increase in viscosity is a factor of at least ten, preferably a factor of at least thirty, more preferably a factor of at least one hundred, and most preferably a factor of at least one thousand. The viscosity of the ink in the printhead corresponds to that determined at low shear (for example $10\ s^{-1}$) while on the substrate the viscosity corresponds to that measured at low stress (for example 0.01 Pa).

Thus the viscosity of the composition in the printhead may typically have a viscosity similar to water, namely about $10^{-3}$ Pa·s. The low shear viscosity on the substrate may, however, typically be about $10^3$ Pa·s.

However the invention is also applicable to polymer particles which are responsive to other than temperature change such as, for example, changes in pH or light or an electrical or magnetic change or a combination thereof. For example if an azo moiety were included in the polymer in the composition, it would be possible to illuminate a drop after leaving the printhead to change its morphology. Alternatively, if the stimulus were pH, it would be possible to initially print the substrate with another ink composition, for example one having an alkaline pH, and then print the ink composition of the invention thereon, having for example an acidic pH, onto the first drop to react therewith. The skilled person would readily appreciate alternative forms of enabling a significant viscosity change in response to a number of external stimuli to achieve the benefit of the present invention. In all cases it is desirable that the switching point from one rheological state to another occurs over as small as a range as possible.

The stimulus-responsive particles, especially thermally-sensitive polymers, may be prepared, for example, by polymerization of monomers which will impart thermal sensitivity, such as N-alkylacrylamides, such as N-ethyl-acrylamide and N-isopropylacrylamide, N-alkylmethacrylamides, such as N-ethyl-methacrylamide and N-isopropylmethacrylamide, vinylcaprolactam, vinyl methyl-ethers, partially substituted vinylalcohols, ethylene oxide modified benzamide, N-acryloylpyrrolidone, N-acryloylpiperidine, N-vinylisobutyramide, hydroxyalkylacrylates, such as hydroxyethylacrylate, hydroxyalkylmethacrylates, such as hydroxyethylmethacrylate, and copolymers thereof, by methods known in the art. The thermally-sensitive polymer particles can also be prepared by micellisation of stimulus-responsive polymers and crosslinked while in micelles. This method applies to such polymers as, for example, certain hydroxyalkyl-celluloses, aspartic acid, carrageenan, and copolymers thereof.

The polymerization may be initiated using a charged or chargeable initiator species, such as, for example, a salt of the persulfate anion, or with a neutral initiator species if a charged or chargeable co-monomer species is incorporated in the preparation, or alternatively by light or heat.

Alternatively copolymers of the stimulus-responsive particles may be created by incorporating one or more other unsubstituted or substituted polymers such as, for example, polyacrylic acid, polylactic acid, polyalkylene oxides, such as polyethylene oxide and polypropylene oxide, polyacrylamides, polyacrylates, polyethyleneglycol methacrylate, polyvinyl alcohol, polyvinyl acetate, polyvinylpyrrolidone, polyvinyl chloride, polystyrene, polyalkyleneimines, such as polyethyleneimine, polyurethane, polyester, polyurea, polycarbonate or polyolefines. Introduction of a copolymer, such as polyacrylic acid or polyethyleneglycol methacrylate, may be useful to fine-tune the switching temperature and swellability.

Any polymeric acidic groups present may be partially or wholly neutralized by an appropriate base, such as, for example, sodium or potassium hydroxide, ammonia solution, alkanolamines such as methanolamine, dimethylethanolamine, triethylethanolamine or N-methylpropanolamine or alkylamines, such as triethylamine. Conversely, any amino groups present may be partially or wholly neutralized by appropriate acids, such as, for example, hydrochloric acid, nitric acid, sulfuric acid, acetic acid, propionic acid or citric acid. The copolymers may be random copolymers, block copolymers, comb copolymers, branched, star or dendritic copolymers.

Particularly preferred stimulus-responsive polymers for use in the preparation of the stimulus-responsive particles of the present invention are for example, a poly-N-alkylacrylamide, especially poly-N-isopropylacrylamide, and a poly-N-alkylacrylamide-co-acrylic acid, especially poly-N-isopropylacrylamide-co-acrylic acid, poly-N-isopropylacrylamide-co-polyethyleneglycol methacrylate, polyhydroxyalkylcellulose, especially polyhydroxypropylcellulose, polyvinylcaprolactam, polyvinylalkylethers or ethyleneoxide-propylene oxide block copolymers.

The number of monomer units in the stimulus-responsive polymer particles may typically vary from about 20 to 1500 k. For example the number of monomer units in poly-N-isopropylacrylamide is from 200-500 k and in poly-vinylcaprolactam is from 20 to 1500 k.

Typically the ratio of hydrophobic moiety to hydrophilic moiety in the stimulus-responsive polymer particles is about 50% although the ratio can be as high as 80%.

Generally a cross-linker may be required to maintain the shape of the polymer particle, although too high a concentration of cross-linker may inhibit the swellability in response to the stimulus. If there is an alternative way of maintaining particle architecture, such as a core particle in a stimulus-responsive polymer shell, it may be possible in some instances, however, to exclude a cross-linker.

Suitable cross-linkers for this purpose include, for example, any materials which will link functional groups between polymer chains and the skilled artisan would choose a crosslinker suitable for the materials being used e.g. via condensation chemistry. Examples of suitable cross-linkers include N,N'-methytenebisacrylamide, N,N'-ethylenebisacrylamide, dihydroxyethylene bisacrylamide, N,N'bisacryloylpiperazine, ethylene glycol dimethacrylate, glycerin triacrylate, divinylbenzene, vinylsulfone or carbodiimides. The crosslinker may also be an oligomer with functional groups which can undergo condensation with appropriate functional groups on the polymer. The crosslinking material is used for partial crosslinking the polymer. The particles can also be crosslinked, for example, by heating or ionizing radiation, depending on the functional groups in the polymer.

The quantity of crosslinker used with respect to the major type of the monomer, if present, should normally be in the range of about 0.1-10 mol %, although not specifically limited thereto. The quantity of crosslinker will determine the crosslinking density of the polymer particles and may adjust, for example, the swelling degree and/or phase transition temperature, of the nonionic polymer.

The polymer particle may also be in the form of a core/shell particle wherein the polymer surrounds a core forming a shell, such that the functional material is itself incorporated into the polymer particles. The interaction with the core can be of a chemical nature such that the polymer would be grafted onto the surface of the core by bonds which are preferably covalent. In this case it would not normally be necessary to use a crosslinker to stabilise the core-shell assemblage. However the interaction can be of a physical nature, for example the core can be encapsulated inside the switchable polymer shell, the stability of the core/shell assemblage being obtained by the crosslinking of the shell material. The core could be functionalized or non-functionalized polystyrene, latex or silica, or titania, a hollow sphere, magnetic or conductive particles or could comprise an organic pigment.

The size and shape of the stimulus-responsive polymer particle needs to be appropriate to the size and shape of the orifice, as well as any filters, through which it has to pass. Since the stimulus-responsive particles are generally approximately spherical, these particles can be made about the same equivalent spherical diameter as conventional pigment particles, knowing that those particles are proven to be reliably jettable. It is preferable that the particle equivalent spherical diameter is less than 0.2 d, where d is the smallest distance between any two opposing points on the perimeter of the nozzle aperture, more preferably less than 0.05 d, most preferably less than 0.015 d and especially less than 0.01 d. Thus, the particle equivalent spherical diameter is preferably manufactured to be 2 µm or less, more preferably 0.5 µm or less, most preferably 0.15 µm or less and especially 0.1 µm or less to reliably pass through nozzle diameters of about 10 µm.

In the case of a core/shell particle, typically the equivalent spherical diameter of the core would be in the range of about 0.005-0.15 µm and the switchable shell surrounding the surface of the core would be sufficient in the contracted state to provide a core/shell particle with such a diameter considerably less than the diameter of the ink jet nozzle to prevent blockage and enable jetting as above. Thus the core/shell particle would have a particle equivalent diameter as stated above for a non-core/shell particle.

When printing, the quantity of a functional material contained in an ink composition, for example a colorant, is defined by the printing purpose. For example, the colorant concentration could be selected such that a so-called 'dark' or 'light' ink were produced, where 'light' refers to an ink formulation containing a lower concentration of colorant, of similar hue, to a 'dark' ink. It is preferable that the quantity of functional material, such as a colorant, namely pigment or dye, in an ink composition is from about 0.1 wt % to about 30 wt %, more preferably from about 0.5 wt % to about 15 wt %, most preferably from about 0.5 wt % to about 10 wt %.

The amount of stimulus-responsive polymer particles is determined experimentally and sufficient must be added for the purpose and in most cases the amount of polymer particles will be in the range of about 0.5 to about 20 vol. %. However, conveniently a form of the Krieger-Doughty equation, which relates the particle addition needed to the change in particle diameter, may be used. Although this theoretical treatment is not a precise specification for thermally-sensitive particle additions, it does serve to provide the general trend and an approximation of the quantity of such particles that might be required.

A consideration can be made of 'hard-spheres' in a Newtonian liquid, wherein the spheres do not deform or stick when they touch and the medium does not change viscosity with change in shear. The way the viscosity η changes as the effective volume fraction of hard-sphere particles increases may be approximated well by the Krieger-Dougherty equation (M. Krieger and T. J. Dougherty, Trans. of the Society of Rheology, 3, 137-152 (1959)):

$$\eta = \eta_o \left(1 - \frac{\phi_e}{\phi_m}\right)^{-[\eta]\phi_m} \quad (1)$$

wherein
  $\eta$ is the intrinsic viscosity of the dispersed particles;
  $\eta_o$ is the continuous phase viscosity;
  $\phi_o$ is the volume fraction of the polymer particles
  $\phi_e$ is the effective volume fraction of the particles; and
  $\phi_m$ is the maximum packing of the particles Swellable cross-linked particles exhibit rheological behaviour similar to that of suspensions of hard-sphere particles ("Rheology of swellable microgel dispersions: Influence of crosslink density" Journal of Colloid and Interface Science, Volume 133, Issue 1, November 1989, Pages 265-277, M. S. Wolfe and C. Scopazzi). If a switchable stimulus-responsive polymer particle is used instead of a hard sphere, that is, the size of the spheres can be changed by some stimulus, then the particles may swell and the effective volume fraction can vary at the same polymer concentration, according to:

$$\phi_e = \phi_0 \left(\frac{d_2}{d_1}\right)^3 \quad (2)$$

wherein
  $d_1$ is the small diameter form of the particles; and
  $d_2$ the large diameter form of the particles.

In this case, the particle diameters are constrained experimentally and thus the actual volume fraction of the particles, $\phi_o$, necessary to obtain immobilisation upon switching can be deduced from equation (2). For example, if $\phi_m$ is 0.64, (Torquato, S., Truskett, T. M. and Debenedetti, P. G., "Is random close packing of spheres well defined?" Phys. Rev. Lett. 84, 2064-2067 (2000)), then the viscosity of a suspension of hard spheres would be expected to become infinite when $\phi_o$ reaches this value. However, for the invention herein using particles that may expand, a suspension of the particles would expect to develop elastic characteristics, such as yield-stress behaviour, when the effective volume fraction exceeds $\phi_m$. Being swellable particles, it is possible to achieve concentrations higher than predicted by a simple extrapolation of hard-sphere behaviour as the particle shape may deform, as seen for high-internal phase emulsions, or there may be a small amount of de-swelling as a result of osmotic crowding effects.

Figure 5:
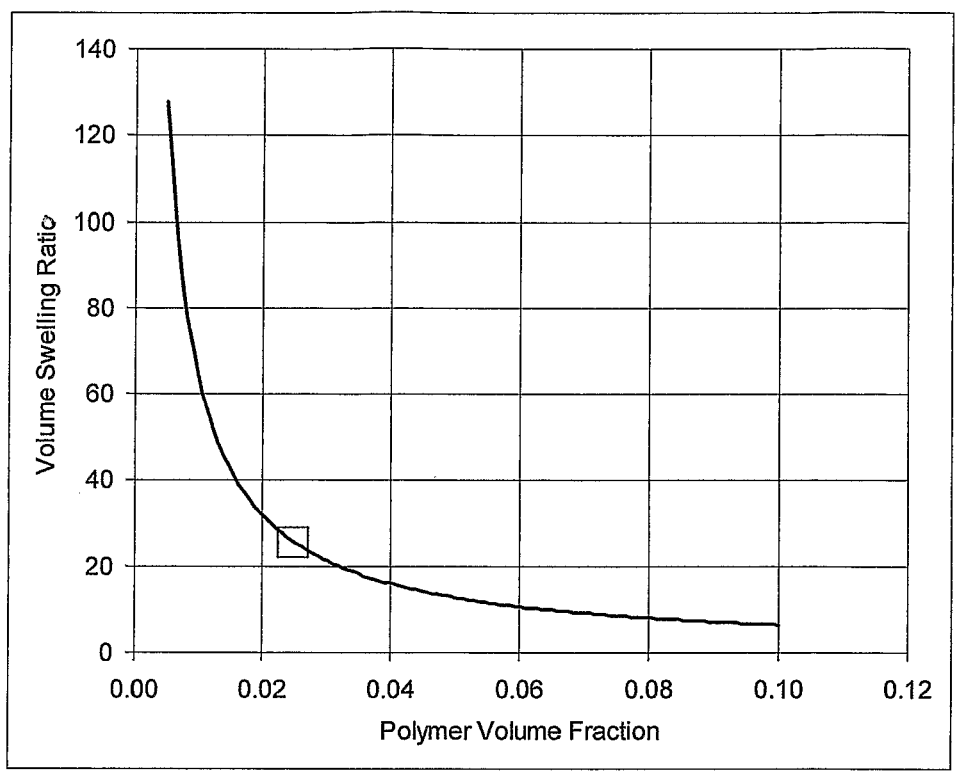
FIG. 5 shows the volume swelling ratio $\phi_e/\phi_o$ necessary to achieve an effective volume fraction $\phi_e$ of 0.64, plotted as a function of polymer volume fraction $\phi_o$
Figure 6:
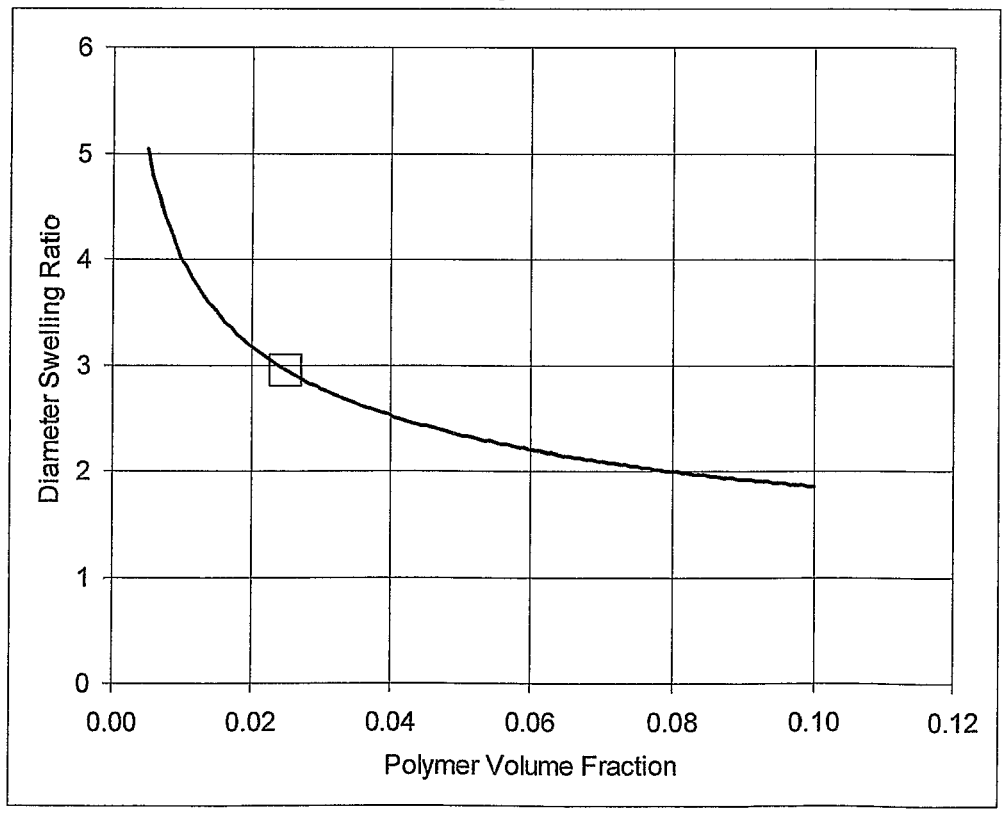
FIG. 6 shows the diameter swelling ratio $d_2/d_1$ necessary to achieve an effective volume fraction $\phi_e$ of 0.64, plotted as a function of polymer volume fraction $\phi_o$, wherein the collapsed polymer diameter is $d_1$ and the effective swollen diameter is $d_2$.

The important factors in controlling the suspension rheology are the volume fraction of polymer and the volume swelling ratio, $\phi_e/\phi_o$ $(=(d_2/d_1)^3)$. Plots of the volume swelling ratio $\phi_e/\phi_o$ and diameter swelling ratios $d_2/d_1$ required to achieve an effective volume fraction of 0.64 are shown as a function of the volume fraction of polymer $\phi_o$ in FIGS. 5 and 6 respectively. It can be seen that a relatively small change in effective particle size (diameter swelling ratio, $d_2/d_1$) leads to a large change in effective volume swelling, such that for example an effective increase in diameter of a factor of three is sufficient to increase the effective volume fraction of a suspension of particles of switchable polymer from 0.025 to just above 0.64. Using this approach, the rheology of a suspension of particles (of polymer volume fraction 0.025) may be changed from a low-viscosity Newtonian liquid in the collapsed state to that of a weakly gelled material with a yield stress as the effective volume fraction is expected to be at least 0.64.

Additional polymers, emulsions or latexes may be used in the inks of the present invention. Any homopolymer or copolymer can be used in the present invention, provided it can be stabilized in an aqueous medium, particularly an aqueous basic medium, and is generally classified as either water-soluble, water-reducible or water-dispersible.

Although the ink composition is primarily water-based, it may be suitable in some instances to include a small amount of an organic solvent, for example up to 10% of a solvent such as, for example, ethanol or methylethyl ketone to improve drying speed on the substrate.

Generally humectants are employed in inkjet compositions to help prevent the ink from drying out in the printhead and to modify ink viscosity. However it can be a particular advantage of the present invention for a continuous inkjet system that a humectant may not be required. This can be particularly useful when printing onto impermeable media surfaces when the humectant can not be absorbed into the media but has to be removed by evaporation. Nevertheless, the addition of one or more humectants in the ink composition is not precluded.

Examples of humectants which could be used, if required, include polyhydric alcohols, such as ethylene glycol, diethylene glycol (DEG), polyethylene glycol, glycerol, 2-ethyl-2-hydroxymethyl-1,3-propanediol (EHMP), 1,2-hexanediol, lower alkyl mono- or di-ethers derived from alkylene glycols, such as ethylene glycol mono-methyl or mono-ethyl ether, diethylene glycol mono-methyl or mono-ethyl ether, propylene glycol mono-methyl or monoethyl ether, triethylene glycol mono-methyl, mono-ethyl or mono-butyl ether (TEGMBE), nitrogen-containing compounds, such as urea, 2-pyrrolidinone, N-methyl-2-pyrrolidinone, diethylene glycol monobutylether (DEGMBE), 1,5-pentanediol and 1,3-dimethyl-2-imidazolidinone; and sulfur-containing compounds such as dimethylsulfoxide.

Preferred humectants for the inkjet ink composition of the invention include DEG, glycerol, DEGMBE, TEGMBE, 1,2-hexanediol, 1,5-pentanediol, urea, 2-pyrrolidinone, EHMP and mixtures thereof. The humectant may be employed in each ink in an amount of from 0 to 80 wt % but generally no humectant is present, or no more than 20 wt % is present, preferably no more than 10 wt %.

Surfactants may be added to the ink to adjust the surface tension to an appropriate level or to prevent aggregation of the stimulus-responsive polymer. The surfactants may be anionic: for example, salts of fatty acids, salts of dialkylsulfosuccinic acid, salts of alkyl and aryl sulfonates; they may be nonionic: for example, polyoxyethylene alkyl ethers, acetylene diols and their derivatives, copolymers of polyoxyethylene and polyoxypropylene, alcohol alkoxylates, sugar-based derivatives; they may be cationic: such as alkylamines, quaternary ammonium salts; or they may be amphoteric: for example, betaines. However the surfactant should normally be selected such that it is either uncharged (non-ionic), has no net charge (amphoteric) or matches the charge of the stimulus-responsive polymer used. The most preferred surfactants include acetylene diol derivatives, such as Surfynol® 465 (available from Air Products Corp.) or alcohol ethoxylates such as Tergitol® 15-S-5 (available from Dow Chemical company). The surfactants can be incorporated at levels of 0.01 to 1% of the ink composition.

A biocide may be added to the ink composition employed in the invention to suppress the growth of microorganisms such as moulds, fungi, etc. in aqueous inks. A preferred biocide for the ink composition employed in the present invention is Proxel® GXL (Avecia Corp.) at a final concentration of 0.0001-0.5 wt. %, preferably 0.05-0.5 wt %.

Additional additives which optionally may be present include thickeners, conductivity-enhancing agents, anti-kogation agents, drying agents, anti-corrosion agents, defoamers and penetrants. In some instances it may be appropriate to include a binder, such as a styrene acrylic or polyurethane resin, to provide robustness to the ink, providing the resin does not crosslink in the orifices in the printhead.

The pH of the aqueous ink compositions employed in the invention may be adjusted by the addition of organic or inorganic acids or bases. Useful inks may have a preferred pH of from 2 to 11, preferably 7 to 9, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

The inks used in the various inkjet printers and in accordance with the present invention comprising a functional material are preferably colorants and can be dye-based or pigment-based, although pigment-based inks are preferred since they provide enhanced image stability, especially light stability.

Pigment-Based Inks

The process of preparing inks from pigments commonly involves two steps: (a) a dispersing or milling step to break up the pigment to the primary particle, and (b) a dilution step in which the dispersed pigment concentrate from step (a) is diluted with a carrier and other addenda to a working strength ink. In the milling step, the pigment is usually suspended in a carrier (typically the same carrier as that in the finished ink) along with rigid, inert milling media. Mechanical energy is supplied to this pigment concentrate, and the collisions between the milling media and the pigment cause the pigment to deaggregate into its primary particles. A dispersant or stabilizer, or both, may be added to the dispersed pigment concentrate to facilitate deaggregation, maintain particle stability and retard particle reagglomeration and settling.

There are many different types of materials that may be used as milling media, such as glasses, ceramics, metals and plastics. In a preferred embodiment, the grinding media can comprise particles, preferably substantially spherical in shape, e.g., beads, consisting essentially of a polymeric resin. In general, polymeric resins suitable for use as milling media are chemically and physically inert, substantially free of metals, solvent and monomers, and of sufficient hardness and firability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Delrin™, vinyl chloride polymers and copolymers, polyurethanes, polyamides, poly(tetrafluoroethylenes), e.g., Teflon®, and other fluoropolymers, high density polyethylenes, polypropylenes, cellulose ethers and esters such as cellulose acetate, poly(hydroxyethylmethacrylate), poly(hydroxyethylacrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly(phosphazenes). The polymeric resin can have a density from 0.9 to 3.0 g/cm$^3$. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an air jet mill, a roller mill, a ball mill, an attritor mill and a bead mill. A high-speed, high-energy mill is preferred by which the milling media obtain velocities greater than 5 m sec$^{-1}$. In the present invention, a sawtooth impeller having a diameter of 40 mm when operated at 9,000 rpm (available from Morehouse-Cowles Hockmeyer) can be used. The preferred proportion of milling media, pigment, carrier and optional dispersant can vary within wide limits and depends, for example, upon the particular pigment, the size and density of the milling media and the particular printing application. For pigment-based inks of the invention, the pigment is present in the dispersed pigment concentrate at 1 to 50 wt. % and the weight ratio of pigment to dispersant is 20:1 to 1:2. After milling is complete, the dispersed pigment concentrate is separated from the milling media by simple sieving or filtration.

The dispersant is an optional ingredient used to prepare the dispersed pigment concentrate. Dispersants which could be used in the present invention include sodium dodecyl sulfate, acrylic and styrene-acrylic copolymers, such as those disclosed in U.S. Pat. Nos. 5,085,698 and 5,172,133 and sulfonated polyesters and styrenics, such as those disclosed in U.S. Pat. No. 4,597,794. Other patents referred to above in connection with pigment availability also disclose a wide variety of dispersant from which to select. Non-ionic dispersants could also be used to disperse pigment particles. Dispersants may not be necessary if the pigment particles themselves are stable against flocculation and settling. Self-dispersing pigments are an example of pigments that do not require a dispersant; these types of pigments are well known in the art of inkjet printing. These may typically have carboxylate, sulfonate or polymeric groups grafted onto the pigment particle surface.

The milling time can vary widely and depends upon the pigment, milling means and residence conditions selected, the initial and desired final particle size, etc. In the present invention, milling times typically range from 1 to 100 hours.

The pigment particles useful in the invention may have any particle size that can be jetted through an ink jet printhead. The pigment particles may have a mean particle size of up to 0.5 µm. Preferably, the pigment particles have a mean particle size of 0.3 µm or less, more preferably 0.15 µm or less.

A wide variety of organic and inorganic pigments, alone or in combination, may be selected for use in the inks of the present invention. Pigments that may be used in the invention include those disclosed in, for example, U.S. Pat. Nos. 5,026,427; 5,086,698; 5,141,556; 5,160,370 and 5,169,436. The exact choice of pigments will depend upon the specific application and performance requirements, such as color reproduction and image stability.

Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide and especially carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; and C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66. In a preferred embodiment of the invention, the pigment is C.I. Pigment Black 7, C.I. Pigment Blue 15:3, C.I. Pigment Red 122, C.I. Pigment Yellow 155, C.I. Pigment Yellow 74, or a bis(phthalocyanylalumino)tetraphenyldisiloxane as described in U.S. Pat. No. 4,311,775.

Commercially used pigment preparations could also be used, such as the IDIS™ series of pigment dispersions by Evonik Degussa or the Hostafine series of pigment preparations of Clariant, such as Hostafine™ Black TS, Blue B2G, Magenta E VP, Yellow GR (which uses Pigment Yellow 13) and Yellow HR (which uses Pigment Yellow 83), or the Hostajet series of pigment dispersions of Clariant, such as the PT and the ST series.

Particularly preferred pigments for use in this invention are, for example, PNB15-3 (cyan), PR122 (magenta), PY74 (yellow), IDIS™ 40 and especially Carbon K (black).

The pigment used in element of the invention is present in any effective amount, generally from 0.1 to 30 wt. %, preferably from 0.5 to 15 wt. %, more preferably 0.5 to 10 wt %.

Dye Based Inks.

Alternatively the colorants which could be used in this invention could be dyes including water-soluble dyes such as: CI Direct Black 2, 4, 9, 11, 17, 19, 22, 32, 80, 151, 154, 168, 171, 194, 199; C.I. Direct Blue 1, 2, 6, 8, 22, 34, 70, 71, 76, 78, 86, 112, 142, 165, 199, 200, 201, 202, 203, 207, 218, 236, 287; C.I. Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189; CI Direct Yellow 1, 2, 4, 8, 11, 12, 26, 27, 28, 33, 34, 41, 44, 48, 51, 58, 86, 87, 88, 132, 135, 142, 144; C.I. Acid Black 1, 2, 7, 16, 24, 26, 28, 31, 48, 52, 63, 107, 112, 118, 119, 121, 156, 172, 194, 208; C.I. Acid Blue 1, 7, 9, 15, 22, 23, 27, 29, 40, 43, 55, 59, 62, 78, 80, 81, 83, 90, 102, 104, 111, 185, 249, 254; C.I. Acid Red: 1, 4, 8, 13, 14, 15, 18, 21, 26, 35, 37, 52, 110, 144, 180, 249, 257, C.I. Acid Yellow 1, 3, 4, 7, 11, 12, 13, 14, 18, 19, 23, 25, 34, 38, 41, 42, 44, 53, 55, 61, 71, 76, 78, 79, 122; C.I. Reactive Red 23, 180; Reactive Black 31; Reactive Yellow 37; water soluble Duasyn™ dyes (from Clariant), water-soluble Irgasperse™ dyes (from Ciba). The dyes can be photochromic, thermochromic or fluorescent.

The support for the ink jet recording element used in the invention can be any of those usually used for ink jet receivers but it is a particular advantage of the present invention that that it can be used for printing onto 'low energy' impermeable substrates, such as, for example, polyethylene and polypropylene. Normally printing onto low energy substrates often involves the use of corona discharge treatment or prior treatment with primers to enable good adhesion. It is a feature of this invention that such pretreatments are not usually necessary. Although the inkjet composition of the present invention can also be used with conventional inkjet substrates, as detailed hereunder, printing onto non-porous substrates is especially preferred, and can also include substrates such as glass, diamond, borosilicates, silicon, germanium and metals such as aluminium, steel or copper.

Conventional substrates include, for example, resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.) and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper and laminated paper, such as biaxially oriented support laminates. Biaxially oriented support laminates are described in U.S. Pat. Nos. 5,853,965; 5,866,282; 5,874,205; 5,888,643; 5,888,681; 5,888,683 and 5,888,714. These biaxially oriented supports include a paper base and a biaxially oriented polyolefin sheet, typically polypropylene, laminated to one or both sides of the paper base.

Polymeric supports also include cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthenate), poly(1,4-cyclo-hexanedimethylene terephthalate), poly(butylene terephthalate), and copolymers thereof; polyimides; polyamides; polycarbonates; polystyrene; polyolefins, such as polyethylene, polypropylene or polybutylene; polysulfones; polyacrylates; polyetherimides; polyvinyl chloride; polyvinylacetate; polyvinylamine; polyurethane; polyacrylonitrile; polyacetal; polytetrafluoroethene; polyfluorovinylidene; polysiloxane; polycarboranes; polyisoprene; rubber and mixtures thereof.

These materials can be coated or laminated onto other substrates or extruded as sheets or fibres; the latter can be woven or compressed into porous but hydrophobic substrates, such as Tyvek®, and mixtures thereof. The papers listed above include a broad range of papers, from high end papers, such as photographic paper, to low end papers, such as newsprint.

When the support used in the invention is a paper support, it may have a thickness of from 50 to 1000 μm, preferably from 75 to 300 μm. Antioxidants, antistatic agents, plasticizers and other known additives may be incorporated into the support, if desired. However the invention is particularly suitable also for printing onto non-linear surfaces, such as food packets and food cans.

In order to improve the adhesion of an ink-receiving layer to the support, the surface of the support may be subjected to a corona-discharge treatment prior to applying the image-receiving layer. However it is a feature of this invention that subjection to corona discharge is not necessarily required.

Further coating compositions may be applied to the substrate printed in accordance with the present invention by any number of well known techniques, including dip-coating, wound-wire rod coating, doctor blade coating, rod coating, air knife coating, gravure and reverse-roll coating, slide coating, bead coating, extrusion coating, curtain coating and the like. Known coating and drying methods are described in further detail in Research Disclosure no. 308119, published December 1989, pages 1007 to 1008. Research Disclosure is a publication of Kenneth Mason Publications Ltd., Dudley House, 12 North Street, Emsworth, Hampshire PO107DQ, United Kingdom. Slide coating is preferred, in which the base layers and overcoat may be simultaneously applied. After coating, the layers are generally dried by simple evaporation, which may be accelerated by known techniques such as convection heating.

Any further post-printing coating composition can be coated either from water or organic solvents, however water is preferred. The total solids content should be selected to yield a useful coating thickness in the most economical way. For particulate coating formulations, solids contents from 10-40% are typical.

The patents and publications referred to herein are incorporated by reference in their entirety.

The invention will now be described with reference to the following examples, which are however, in no way to be considered limiting thereof.

EXAMPLES

Example 1

Preparation of Thermally-Sensitive Polymer Particles 15.8 g N-isopropylacrylamide (obtainable from Aldrich), 0.301 g N,N'-methylenebisacrylamide (obtainable from Aldrich) and 0.31 g sodium dodecyl sulfate (SDS) were added to a 1 l double-walled glass reactor equipped with a mechanical stirrer and condenser. 900 ml water was added and the mixture warmed to 40° C., purged with nitrogen for 30 min. while being stirred at 500 rpm. The solution was then heated to 70° C. and 0.60 g potassium persulfate initiator (dissolved in 100 ml deionised water which had been purged with nitrogen) was added quickly to the reactor. The mixture was stirred at 400 rpm at 70° C. for 5 h under nitrogen. The reaction mixture rapidly became opalescent then became white. The heating was switched off and the mixture left to cool down to room temperature. The reaction yielded a white latex which was filtered, then dialysed until the conductivity of the permeate was less than 10 μS. The dialysed latex was freeze-dried yielding approximately 15 g of poly-N-isopropylacrylamide powder.

The particle size of the suspension of the thermally-sensitive particles was measured as a function of temperature from 10 to 50° C. by photon correlation spectroscopy (PCS) using a Malvern Zetasizer™ 3000HS. A dilute sample of thermally-sensitive particles was obtained directly from the preparation vessel and was diluted with 1 mM sodium chloride solution to obtain a count rate in the Zetasizer instrument of from 100,000 to 500,000 counts/sec. FIG. 2 shows the typical particle diameters for a suspension of thermally-sensitive particles (represented by Curve A) and a thermally-insensitive latex (represented by Curve B).

Figure 4:
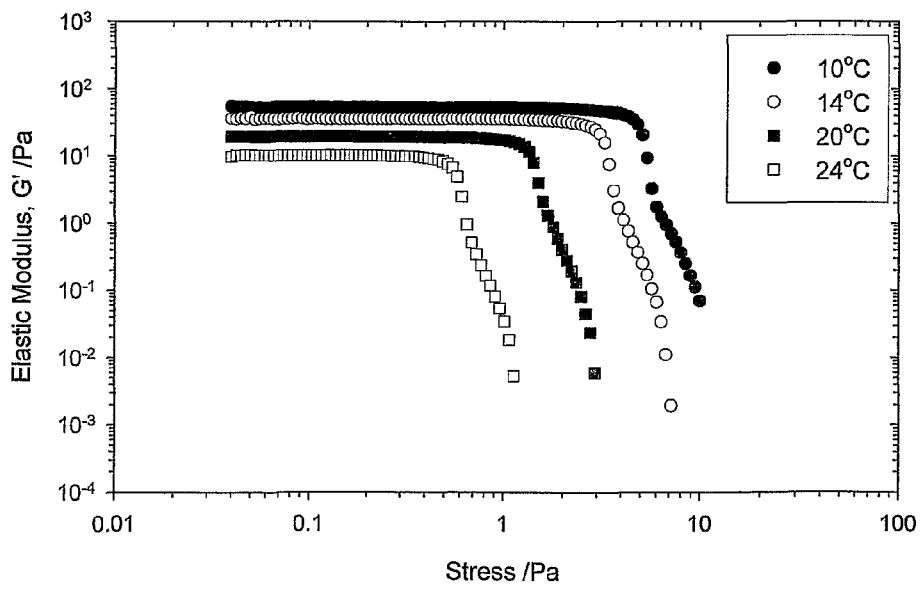
FIG. 4 is a graph of elastic modulus v. stress at a frequency of 1 rad·s$^{-1}$ at a range of temperatures from 10° C. to 24° C. of the stimulus-responsive particles in water at a concentration of 4% w/w.

The viscosity of the suspension of thermally-sensitive particles was measured using a Bohlin™ CS50 rheometer with a bob-and-cup geometry (C2.3/26). The viscosity was measured as a function of shear stress from 10-40° C. A typical data set is shown in FIG. 3 for a 4% w/w suspension. The data show that the low shear viscosity increases by four orders of magnitude on reducing the temperature from 34° C. to 26° C. Above 34° C., the viscosity is close to that of water, namely about $10^{-3}$ Pa·s. and shows little change with temperature. In contrast, at temperatures of 24° C. and below, studies in oscillatory shear show that the suspensions have elastic properties, as characterised by a yield stress that increases in value as temperature falls (FIG. 4).

Example 2

Preparation of Co-Polymer Particles which are Thermally-Sensitive 13.7 g N-isopropylacrylamide (obtainable from Aldrich), 0.272 g N,N'-methylenebisacrylamide (obtainable from Aldrich), 0.365 g acrylic acid (obtainable from Aldrich) and 0.272 g sodium dodecyl sulfate were added to a 1l double-walled glass reactor equipped with a mechanical stirrer and condenser. 900 ml water was added and the mixture warmed to 40° C., purged with nitrogen for 1 h 30 min. while being stirred at 400 rpm. The solution was then heated to 70° C. and 0.540 g potassium persulfate initiator (dissolved in 90 ml deionised water which had been purged with nitrogen) was added quickly to the reactor. The mixture was stirred at 200 rpm at 70° C. for 6 h under nitrogen. The reaction mixture rapidly became opalescent then became white. The heating was switched off and cooled down. The reaction yielded a white latex which was filtered, then dialysed for several days until the conductivity of the permeate was 7 μS. The dialysed latex was freeze-dried yielding approximately 12 g of poly-N-isopropylacrylamide-co-acrylic acid powder.

Example 3

Preparation of a Pigment Dispersion 30 g Monarch 880 carbon black (Cabot) was mixed with 214.4 g demineralised water, followed by 55.6 g Joncryl™ HPD96DMEA dispersant (available from Johnson Polymer). Zirconia beads of 0.6-0.8 mm diameter were added to the mixture, which was milled until the carbon black could not be milled down further. The zirconia beads were removed by filtration leaving a black dispersion with a mean particle size of 98 nm.

Example 4

Preparation of a Pigment Dispersion 40 g Monarch 880 carbon black (Cabot) was mixed with 221.6 g water, followed by 48.4 g Joncryl™ HPD96E dispersant (Johnson Polymer). The mixture was milled with zirconia beads of 0.6-0.8 mm diameter, until the carbon black could not be milled down further. The zirconia beads were removed by filtration leaving a black dispersion with a mean particle size of 125 nm.

Example 5

Preparation of Comparative Ink 1

15 g demineralised water was added to 15 g of the dispersion of Example 3 to form 30 g of a homogeneous ink.

Example 6

Preparation of Comparative Ink 2

15 g of the dispersion in Example 3 was diluted with 13.1 g demineralised water, followed by the addition of 1.2 g Joncryl™ ECO2124 polymeric binder (from Johnson Polymer) until well-mixed to form 30 g of ink.

Example 7

Preparation of Comparative Ink 3

1.16 g of IDIS 40 (Evonik Degussa) was diluted with 24.0 g demineralised water, followed by addition of 0.9 g Joncryl™ ECO2124 polymeric binder (from Johnson polymer) until well-mixed to form 30 g of ink.

Example 8

Preparation of Inventive Ink 4

15 g of the dispersion in Example 3 was mixed with 0.8 g demineralised water followed by 9.2 g of a 3.25% solution of the thermally-sensitive polymer particles of Example 1, forming 30 g of ink.

Example 9

Preparation of Inventive Ink 5

5.0 g IDIS 40 (Evonik Degussa) was diluted with 15.1 g demineralised water, followed by 9.9 g of a 4.55% solution of the thermally-sensitive polymer particles of Example 1, forming 30 g of ink.

Example 10

Preparation of Inventive Ink 6

5.01 g IDIS 40 (Evonik Degussa) was diluted with 9.78 g demineralised water, followed by 15.24 g of a 1.97% solution of the thermally-sensitive polymer particles of Example 2, forming 30 g of ink.

Example 11

Preparation of Thermally-Sensitive Encapsulated Pigment 2.03 g PR122 magenta pigment (Sun Chemicals) was homogenized in 350 ml water using a Polytron mixer operated at 10,000 rpm for 1 h. 340 g of the pigment dispersion was added to a 1l double-walled reactor equipped with a mechanical stirrer and a condenser. 75 ml of water was added and the mixture warmed to 40° C. and purged with nitrogen for 1 h, while being stirred at 200 rpm.

In another flask, 3.57 g N-isopropylacryamide (Aldrich). 0.24 g N,N'-methylenebisacrylamide (Aldrich), 0.15 g sodium dodecyl sulfate (SDS, Aldrich) and 495 g water were mixed. This monomer mixture was purged with nitrogen at room temperature for 1 h 30 min. 0.21 g potassium persulfate initiator was added to the monomer mixture.

The monomer mixture was then added to the 1l double-walled reactor and the reaction mixture was stirred at room temperature for 6 h, purged with nitrogen and stirred at 200 rpm. The temperature was then quickly increased to 70° C. and the reaction was continued for 15 h. A pink milky solution was obtained. After cooling, the reaction mixture was centrifuged at 15° C. and at 6,000 rpm for 30 min. A sediment fraction was collected and dried under vacuum for 12 h, leading to 1.86 g pink powder. The supernatant part was dried using a rotative evaporator and 3.90 g light pink powder was obtained. 0.36 g of sodium chloride was added to 155 ml of the supernatant and the mixture was stored in an oven at 50° for 36 h. A sediment was obtained and separated by filtration and dialysed until conductivity of the permeate was less than 10 µS. The purified sediment was freeze-dried and 0.50 g pink powder was recovered (referred as the encapsulated pigment).

1H NMR spectra on solution in trifluoroacetic acid showed that the encapsulated pigment contained 1.5 wt % of PR122 pigment and 98.5 wt % of poly(N-isopropylacrylamide).

Figure 7:
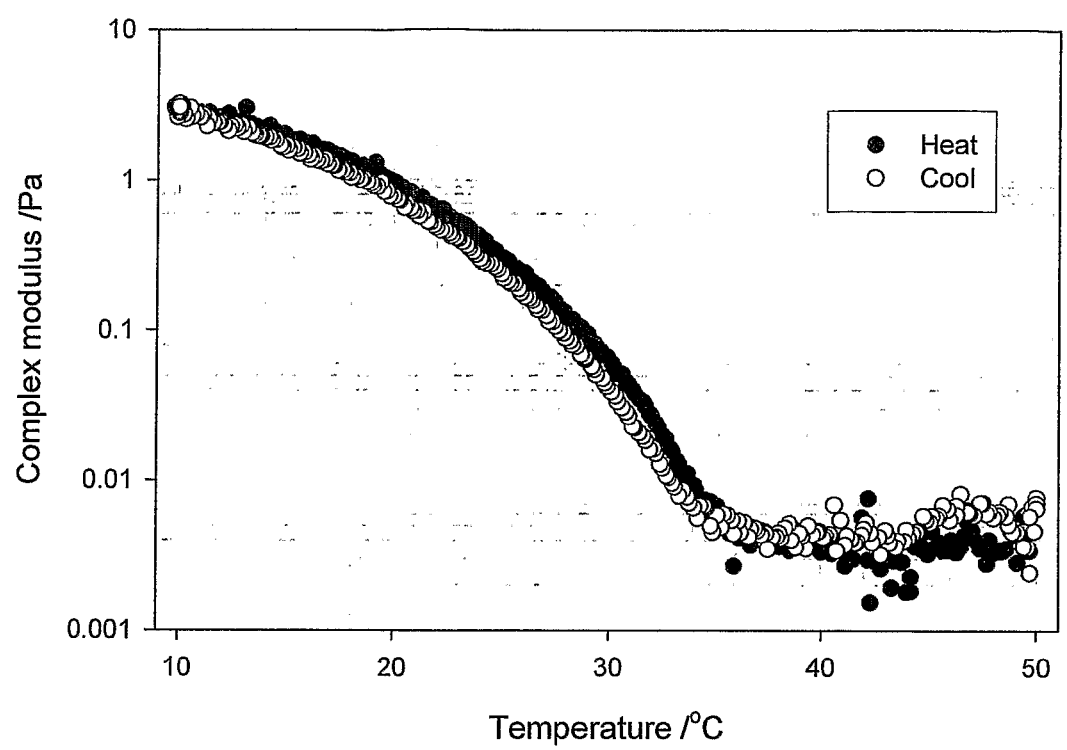
FIG. 7 is a graph of complex modulus at 1 rad·s$^{-1}$ versus temperature of a stimulus-responsive encapsulated pigment subjected to an increase in temperature to 50° C., followed by a decrease to 10° C.

A sample containing 5% of the encapsulated pigment was prepared by dispersing the powder in de-ionised water. Measurements were made using a Bohlin CVO120HR rheometer with a C2.3/26 bob-and-cup geometry. After thermal equilibration at 10° C., the sample was subjected to an increase in temperature to 50° C. followed by a decrease back to 10° C. The rate of change of temperature was 0.5° C. min$^{-1}$ on both heating and cooling, with a 2 min hold at 50° C. The rheological response was measured in low-amplitude oscillation at a stress of 0.004 Pa and frequency of 1 rad·s$^{-1}$. At low temperatures, the sample had significant elastic character (the phase angle was below 45° at temperatures below 13° C.), whilst at high temperatures, the sample exhibited fluid properties, as shown in FIG. 7. (The phase angle is the lag between the applied oscillatory stress and the measured strain, 90° corresponding to pure fluid and 0° corresponding to pure solid).

The sample transition from high viscosity/viscoelastic to fluid on increasing temperature was reversible on decreasing temperature.

Example 12

Testing of Inks

The 5% carbon black inks prepared in Examples 5-10 were coated on polyethylene coated paper base to 12 µm wet thickness. When dried, a drop of the fresh uncoated ink was dropped onto the coating and immediately blotted away with tissue. If coating was removed, the redispersibility of the ink was regarded as acceptable for continuous inkjet printing.

TABLE 1

| Ex. No. | Dispersion type | Polymer type | % Added polymer | Coating Quality | Redispers'y | Comp/Inv. |
|---|---|---|---|---|---|---|
| 5 | Ex. 3 | — | 0.0 | Poor | Ok | Comp. |
| 6 | " | Joncryl ECO2124 | 1.5 | Good | No | Comp. |
| 7 | IDIS 40K | Joncryl ECO2124 | 1.5 | Good | No | Comp. |
| 8 | Ex. 3 | polyNIPAM particles | 1.5 | Good | Ok | Inv. |
| 9 | IDIS 40K | polyNIPAM particles | 1.5 | Good | Ok | Inv. |
| 10 | IDIS 40K | polyNIPAM-co-acrylic acid particles | 1.0 | Good | Ok | Inv. |

All the inks that were tested were made at 5% carbon black. The results show that, simple aqueous dilution of the dispersion of Example 3 at 5% of carbon black resulted in very poor coating quality. The addition of conventional polymeric binder to the dispersion improved the coating quality, but the resulting coating was not redispersible using the test in Example 12, so these inks cannot be used in continuous inkjet systems without significant down-times for cleaning and removal of hardened deposits. However, addition of 1% of thermally-sensitive polymer particles to a diluted carbon black dispersion provided coatings of good quality which were redispersible.

Example 13

Preparation of Inventive Ink A 13.3 g of the 15.0 wt % solution of a black dye, Duasyn™ KRL-SF, was mixed with 66.7 g of a 7.5 wt % aqueous solution of the thermally-sensitive polymer particles from Example 1, 0.5 g of the fluorocarbon surfactant Zonyl™ FSN and sufficient demineralised water added to form 100 g of ink.

Example 14

Preparation of Comparative Ink B 13.3 g of the 15.0 wt % solution of a black dye, Duasyn™ KRL-SF, was mixed with 0.5 g of the fluorocarbon surfactant Zonyl™ FSN and sufficient demineralised water added to form 100 g of ink.

Figure 10:
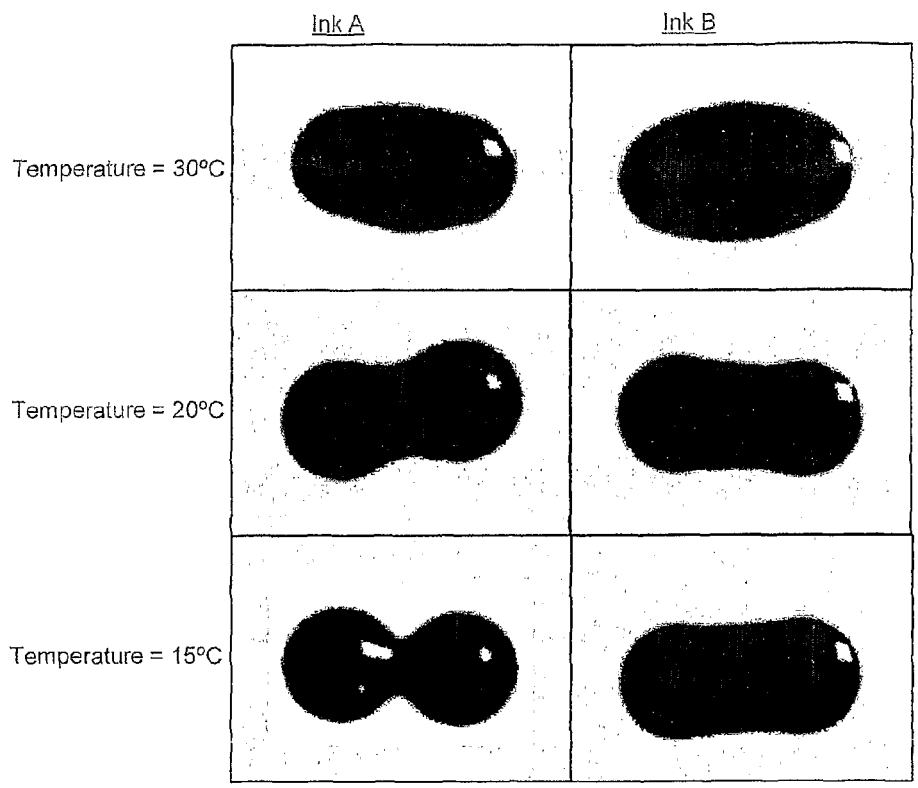
FIG. 10 is a comparison of dye-based inks warmed to 31° C. and applied to substrates at 30° C., 20° C. and 15° C., wherein Ink A is an ink composition of the invention and Ink B is a comparative ink composition.

Ink B was warmed to 31° C. before two droplets were applied simultaneously onto the surface of an untreated polyethylene substrate such that upon wetting out the two droplets touched. When the droplets touched they coalesced immediately. After 1 min when coalescence was complete, the droplets were photographed. This procedure was repeated but the temperature of the substrate surface was varied. Three experimental runs were performed with the substrate surface temperature maintained at 30° C., 20° C. and 15° C. and the results are shown in FIG. 10.

In the same way, Ink A was warmed to 31° C. before two droplets were applied simultaneously onto the surface of an untreated polyethylene substrate such that upon wetting out the two droplets touched. When the droplets touched the degree of coalescence that occurred was found to depend on the temperature of the substrate surface and hence the temperature of the ink on that surface. The lower the temperature of Ink A, the higher the ink viscosity became (see FIG. 2), thereby immobilising the droplets on the surface and preventing coalescence. After 1 min, when any coalescence that might have occurred was complete, the droplets were photographed. This procedure was repeated but the temperature of the substrate surface was varied. Three experimental runs were performed with the substrate surface temperature maintained at 30° C., 20° C. and 15° C. and the results shown in FIG. 10.

Examples 15 and 16

Preparation of Inventive Ink C and Comparative Ink D

These inks were made-up and tested using the same procedures employed for Examples 13 and 14, except that a pigment Idis 40K (Evonik Degussa), was substituted in the same amount for the dye Duasyn KRL-SF to make Inventive Ink C and Comparative Ink D respectively.

Ink D was warmed to 31° C. before two droplets were applied simultaneously onto the surface of an untreated polyethylene substrate previously cooled to 15° C., such that upon wetting out the two droplets touched. When the droplets touched they coalesced immediately. After 1 min the droplets were photographed.

Figure 11:
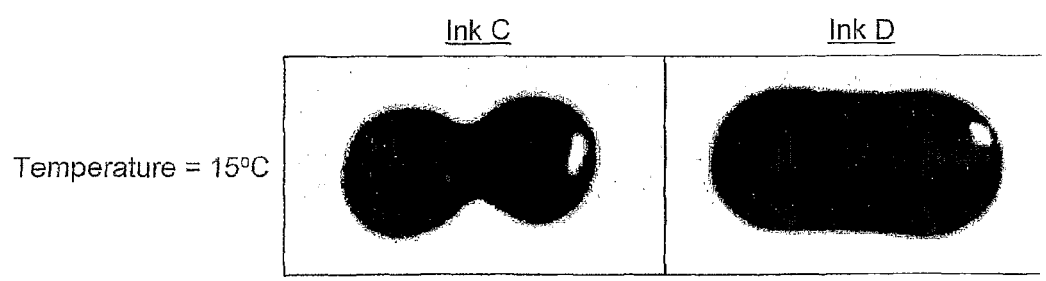
FIG. 11 is a comparison of pigment-based inks warmed to 31° C. and applied to substrates at 15° C., wherein Ink C is an ink composition of the invention and Ink D is a comparative ink composition.
Figures 12A, 12B, 12C, 12D, 12E:
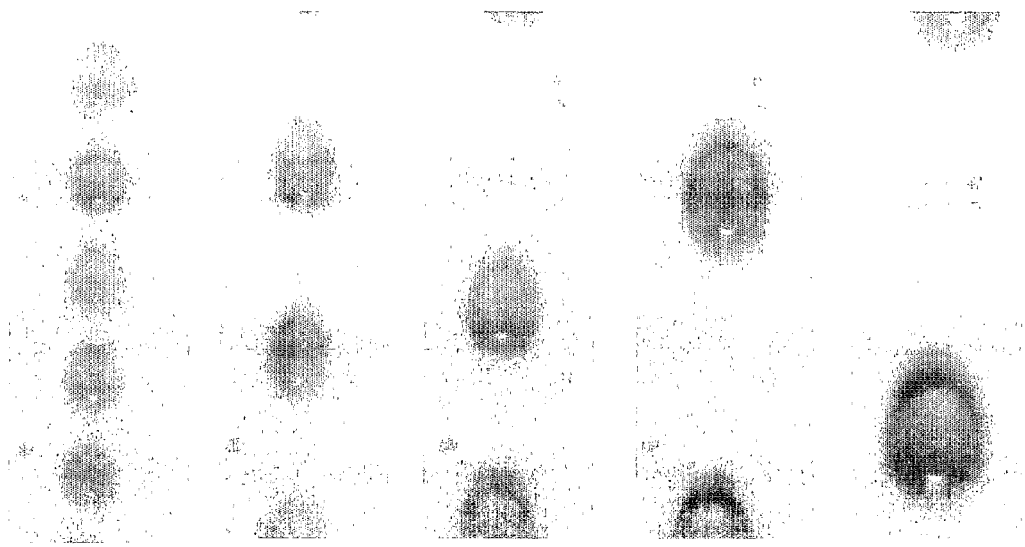
FIGS. 12a-12e and 13a-13e show respectively the results obtained when comparative ink composition D and ink composition C of the invention (each including however sodium dodecyl sulfate as surfactant) were warmed to 40° C. and jetted at constant velocity and frequency as a continuous stream of droplets onto a polyethylene web, the speed of which decreased from 12a to 12e and 13a to 13e respectively.
Figures 13A, 13B, 13C, 13D, 13E:
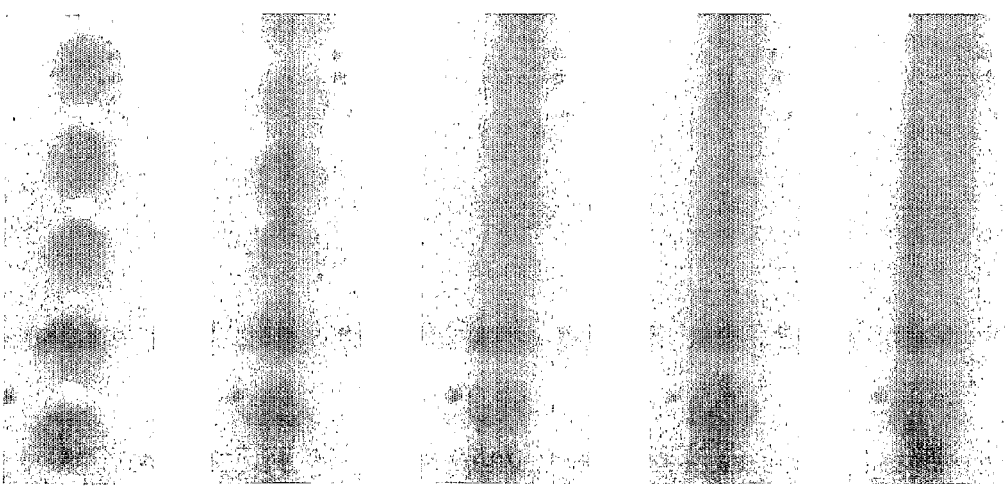
Figure 14A:
FIGS. 14a to 14i show the results obtained when the ink composition C of FIG. 13. was jetted under the same conditions but onto a variety of web surfaces, namely (a) polyethylene, (b) PVC, (c) polypropylene (d) plain paper 9e) lithographic paper (f) Teslin SP (synthetic paper) (g) porous inkjet paper (h) swellable inkjet paper and (i) polytetrafluoroethylene.
Figure 14B:
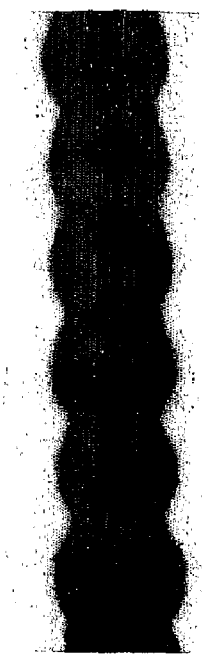
Figure 14C:
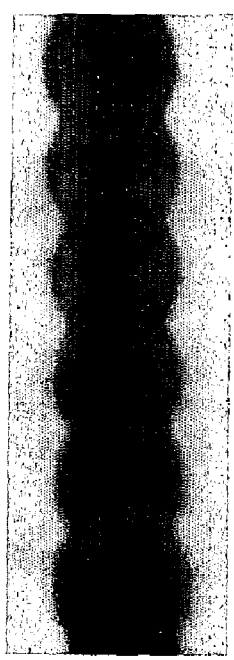
Figure 14D:
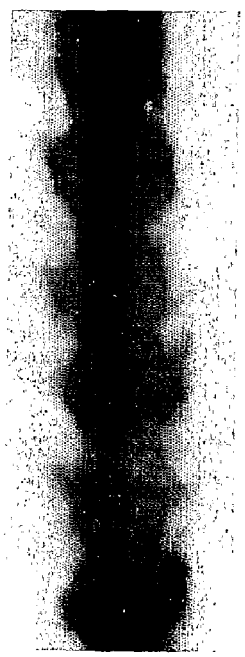
Figure 14E:
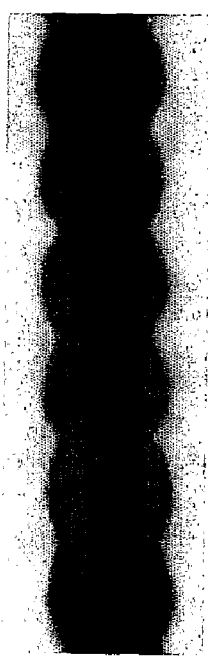
Figure 14F:
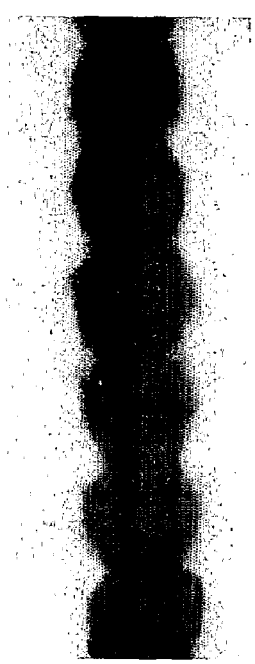
Figure 14G:
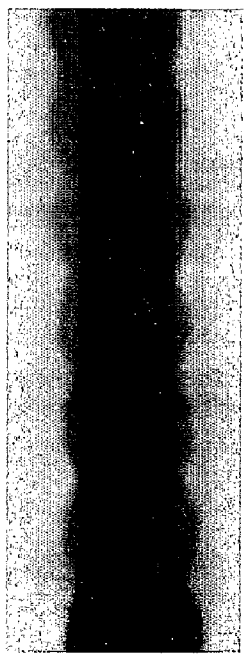
Figure 14H:
Figure 14I:
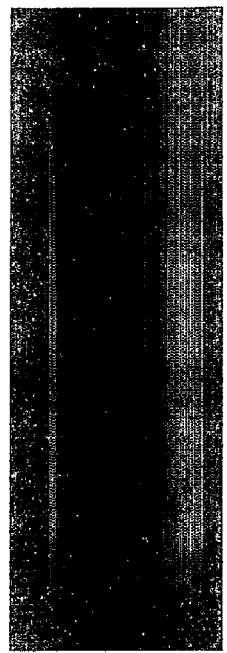

In the same way, Ink C was warmed to 31° C. before two droplets were applied simultaneously onto the surface of an untreated polyethylene substrate previously cooled to 15° C., such that upon wetting out the two droplets touched. When the droplets touched the degree of coalescence was much reduced because of the increase in viscosity induced by the presence of the thermally-sensitive polymer particles. After 1 min., when any coalescence that might have occurred was complete, the droplets were photographed (FIG. 11).

Examples 17 and 18

Preparation and Printing of Inventive Ink C and Comparative Ink D

The pigmented inks C and D were prepared as described in Examples 15 and 16, except for the addition of about 0.12 wt % of the surfactant sodium dodecyl sulfate. The inks were warmed to about 40° C. and jetted as a continuous stream of droplets using a continuous inkjet printer, such as described in U.S. Pat. No. 6,554,410, onto a smooth, moving polyethylene web with a surface temperature of about 20° C. While the jet velocity and jetting frequency, that is the size and the rate at which droplets were jetted, were maintained constant at about 60 μm diameter and about 10 kHz, the speed of the polyethylene web as it passed beneath the stream of droplets was varied. Initially the web speed was such that the ink was printed so that droplets on the surface of the polyethylene were separated. The web speed was then slowed sequentially so that the droplets began to overlap more and more. The effect of these web-speed variations was observed using a high-speed video camera placed downstream of the printhead.

Figure 8:
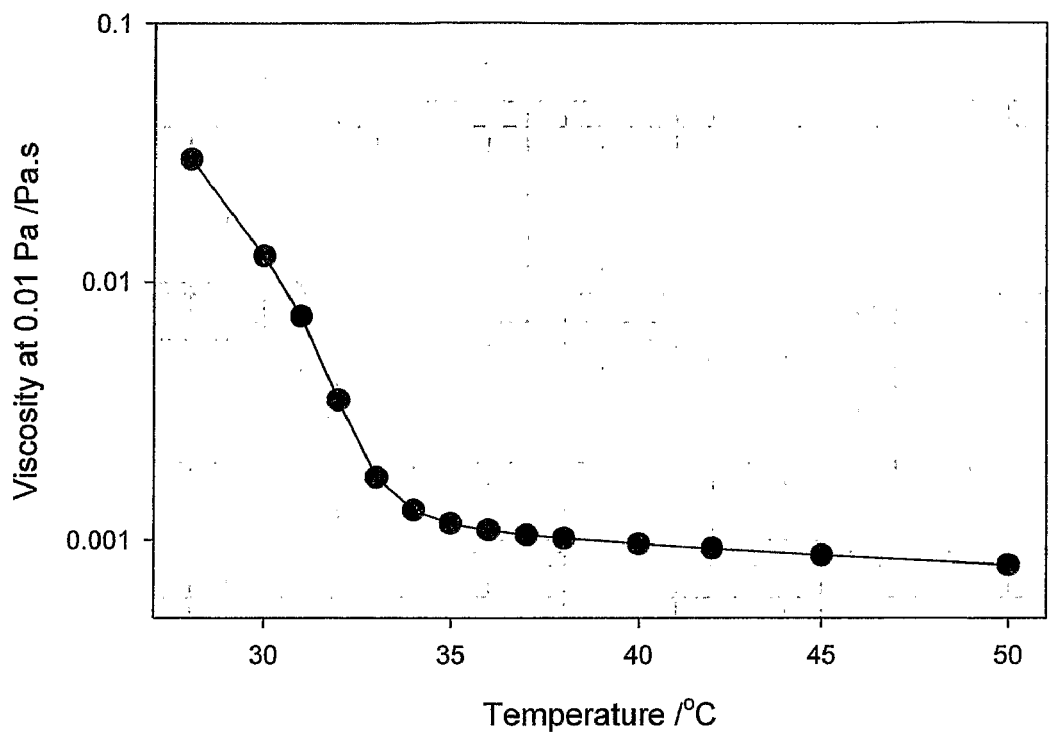
FIG. 8 is a graph of viscosity measured at 0.01 Pa versus temperature from 28° C. to 50° C. of an inkjet composition containing a stimulus-responsive particles.

In addition, rheological measurements of Inventive Ink C were made using a Bohlin™ CVO120HR rheometer with a DG24/27 double-gap geometry. From 28° C. to 50° C. measurements in continuous shear were made on the sample from 0.0028 to 0.05 Pa at a series of increasing temperatures. At each temperature, ten stress measurements were made at logarithmically spaced intervals; 180 s was taken to make the measurement at each stress value. The measurements from 28° C. describe a fluid sample and the viscosity at 0.01 Pa is shown as a function of temperature in FIG. 8. Above the region 33-35° C., the solution viscosity was close to that of water. The sample transition from high viscosity/viscoelastic material to simple, low-viscosity fluid on increasing temperature was reversible on decreasing temperature.

Figure 9:
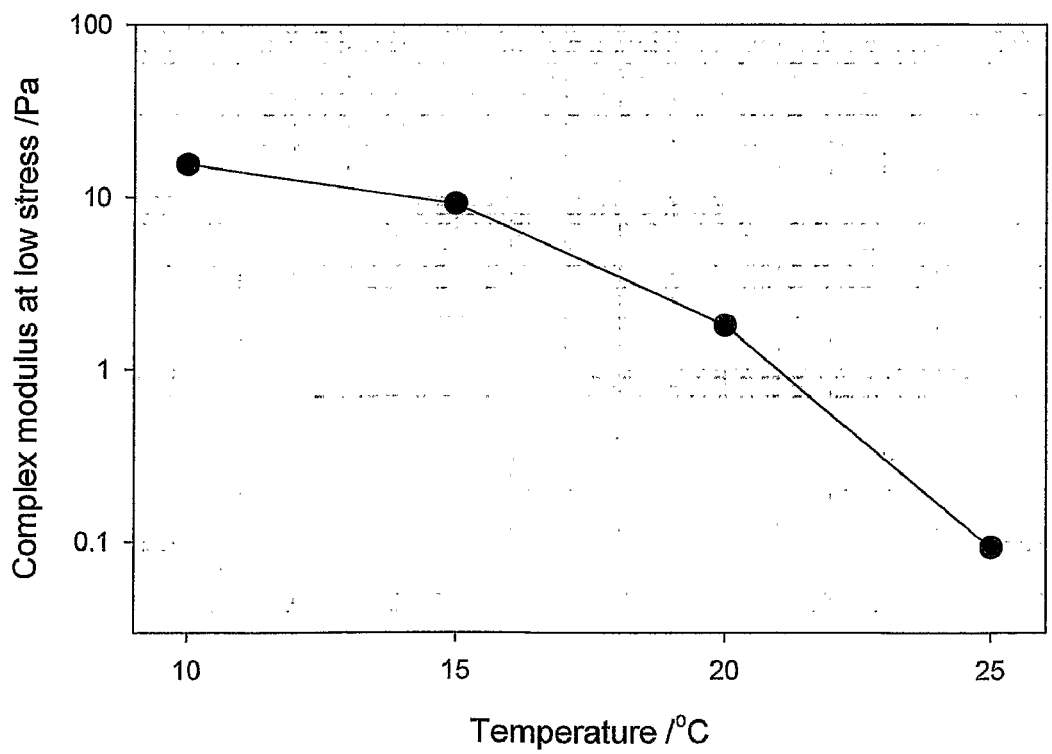
FIG. 9 is a graph of complex modulus at 1 rad·s$^{-1}$ at low stress versus temperature from 10° C. to 25° C. of a stimulus-responsive polymer particles.

After thermal equilibration at 10° C., measurements of increasing then decreasing stress (0.02-20–0.02 Pa) were performed in oscillatory shear at a frequency of 1 rad·s$^{-1}$. This procedure was repeated at 5° C. intervals to 25° C. These lower-temperature measurements in oscillatory flow characterise the transition from elastic to fluid behaviour and the low-stress limiting values of complex modulus, are shown in FIG. 9.

The results obtained from printing Comparative ink D are shown in FIGS. 12a to 12e. It was clear that as soon as the ink droplets were deposited on the surface so that they touched, the droplets immediately coalesced. The greater the degree of overlap, the larger the coalesced droplets became.

The results obtained from printing the Inventive ink C under the same conditions are shown in FIGS. 13a to 13e. In this case the droplets quickly immobilised when they were deposited on the web surface and coalescence was prevented completely. A 'scalloped' appearance of immobilised, overlapping droplets was especially clear as droplet overlap was initiated.

Example 19

Preparation and Printing of Inventive Ink C

The Inventive ink C was prepared as described in Example 17, again with about 0.12 wt % of the surfactant sodium dodecyl sulfate and jetted under the same conditions as described in Examples 17 and 18, except in this case the web-speed was maintained at a constant speed, so that the printed droplets always overlapped partially, and the material comprising the web was varied. In this way Inventive ink C was printed onto a variety of surfaces. The results obtained are shown in FIGS. 14a to 14i show that, regardless of the surface, the droplets quickly immobilised when they were deposited on the various web surfaces and coalescence was prevented completely. The 'scalloped' appearance of immobilised, overlapping droplets was clearly apparent for all the surfaces.

The invention claimed is:

1. An aqueous inkjet ink composition which comprises a polymeric compound comprising discrete particles responsive to an external stimulus, and a functional material selected from the group consisting of a colorant, magnetic particles, conducting or semi-conducting particles, and quantum dots, the composition having a first rheological state and a different second rheological state in response to a stimulated change in conditions, the first rheological state being associated with a first lower viscosity of the composition, wherein the discrete particles have a first lower volume, enabling the composition to pass through an inkjet printhead orifice and the second rheological state being associated with a second higher viscosity of the composition, wherein the discrete particles have a second higher volume, enabling immobilization of droplets of the composition on a substrate therefore, the discrete particles having an equivalent spherical diameter of 0.5 μm or less in the first lower volume, and the discrete particles being crosslinked to maintain particulate shape in both the first and second rheological states, and wherein the functional material is incorporated into the discrete particles.

2. The composition of claim 1 wherein the external stimulus is change in temperature, pH, light, redox potential, electrical, property magnetic property, or a combination thereof.

3. The composition of claim 2 wherein the external stimulus is change in temperature.

4. The composition of claim 1 wherein the discrete particles have an equivalent spherical diameter of 0.15 μm or less in the first lower volume.

5. The composition of claim 1 wherein the discrete particles are derived from monomers selected from the group consisting of N-alkylacrylamides, N-alkylmethacrylamides, vinylcaprolactam, vinyl methylethers, partially substituted vinylalcohols, ethylene oxide modified benzamide, N-acryloylpyrrolidone, N-acryoylpiperidine, N-vinylisobutyramide, hydroxyalkylacrylates, hydroxyalkylmethacrylates, and copolymers thereof.

6. The composition of claim 1 wherein the discrete particles are copolymers which comprise one or more polymers selected from polyacrylic acid, polylactic acid, polyalkylene oxides, polyacrylamides, polyacrylates, polyethyleneglycol methacrylate, polyvinyl alcohol, polyvinyl acetate, polyvinylpyrrolidone, polyvinyl chloride, polystyrene, polyalkyleneimines, polyurethane, polyester, polyurea, polycarbonate and polyolefines.

7. The composition of claim 1, wherein the discrete particles are selected from poly-N-isopropylacrylamide, poly-N-isopropylacrylamide-co-acrylic acid or poly-N-iso-propylacrylamide-co-polyethyleneglycol methacrylate.

8. The composition of claim 1 wherein the discrete particles are crosslinked with a crosslinker linking functional groups between polymer chains.

9. The composition of claim 8 wherein the crosslinker is selected from the group consisting of N,N'-methylenebisacrylamide, N,N'-ethylene-bisacrylamide, dihydroxyethylene bisacrylamide, bis-acryloylpiperazine, ethylene glycol dimethacrylate, glycerin triacrylate, divinylbenzene, vinylsulfone and carbodiimides.

10. The composition of claim 8 wherein the amount of crosslinker is from about 0.01 to about 10 mol % with respect to monomers of the polymer chains.

11. The composition of claim 1 wherein the discrete particles are core/shell particles wherein the polymer surrounds a core and is chemically bonded thereto or physically associated therewith wherein the core is encapsulated within the polymer.

12. The composition of claim 11 wherein the core has an equivalent spherical diameter of 0.03 to 0.15 μm and is selected from polystyrene, silica, titania, a hollows sphere, magnetic or conductive particles or an organic pigment.

13. The composition of claim 1 wherein a surfactant is present and is selected to have no charge or no net charge or to match the ionic charge of the stimulus-responsive particle used.

14. The composition of claim 1 wherein a humectant is present and selected from the group consisting of diethylene glycol, glycerol, diethylene glycol monobutyleyther, triethylene glycol mono-methyl, mono-ethyl or mono-butyl ether, 1,2-hexanediol, 1,5-pentanediol, urea, 2-pyrrolidinone, 2-ethyl-2-hydroxymethyl-1,3-propanediol, and mixtures thereof.

15. An inkjet printing method comprising the steps of:
A) providing an inkjet printer that is responsive to digital data signals;
B) loading the printer with an ink-receiving element comprising a support;
C) loading the printer with an aqueous inkjet ink composition; and
D) printing on the ink-receiving element using the aqueous inkjet ink composition in response to the digital data signals,
wherein the inkjet ink composition comprises a polymeric compound comprising discrete particles responsive to an external stimulus, and a functional material selected from the group consisting of a colorant, magnetic particles, conducting or semi-conducting particles, and quantum dots, the particles causing the composition to have a first rheological state and a different second rheological state in response to a stimulated change in conditions, the first rheological state being associated with a first lower viscosity of the composition, wherein the particles have a first lower volume, enabling the composition to pass through an inkjet printhead orifice and the second rheological state being associated with a second higher viscosity of the composition, wherein the discrete particles have a second higher volume, enabling immobilisation of droplets of the composition on a substrate therefore, the discrete particles having an equivalent spherical diameter of 0.5 μm or less in the first lower volume, and the discrete particles being crosslinked to maintain particulate shape in both the first and second rheological states, and wherein the functional material is incorporated into the discrete particles.

16. The inkjet printing method of claim 15, for use in a continuous inkjet printing system.

17. The inkjet printing method of claim 15 wherein the support comprises an impermeable surface.

* * * * *

UNITED STATES PATENT AND TRADEMARK OFFICE
CERTIFICATE OF CORRECTION

| | | |
|---|---|---|
| PATENT NO. | : 8,263,683 B2 | Page 1 of 1 |
| APPLICATION NO. | : 12/517213 | |
| DATED | : September 11, 2012 | |
| INVENTOR(S) | : Gibson et al. | |

It is certified that error appears in the above-identified patent and that said Letters Patent is hereby corrected as shown below:

In Column 24, line 3 (Claim 14), delete "monobutyleyther" and insert -- monobutylether --.

Signed and Sealed this
Fifteenth Day of January, 2013

David J. Kappos
*Director of the United States Patent and Trademark Office*